US007457396B2

(12) United States Patent
Claudatos et al.

(10) Patent No.: US 7,457,396 B2
(45) **Date of Patent: *Nov. 25, 2008**

(54) AUTOMATED CALL MANAGEMENT

(75) Inventors: Christopher Hercules Claudatos, San Jose, CA (US); William Dale Andruss, Minneapolis, MN (US); Bruce David Leetch, Mason, OH (US); Jeffrey Keith Porter, Springboro, OH (US)

(73) Assignee: EMC Corporation, Hopkinton, MA (US)

( * ) Notice: Subject to any disclaimer, the term of this patent is extended or adjusted under 35 U.S.C. 154(b) by 783 days.

This patent is subject to a terminal disclaimer.

(21) Appl. No.: 10/884,473

(22) Filed: Jul. 1, 2004

(65) Prior Publication Data

US 2005/0053212 A1 Mar. 10, 2005

Related U.S. Application Data

(60) Provisional application No. 60/500,453, filed on Sep. 5, 2003.

(51) Int. Cl.
*H04M 1/64* (2006.01)

(52) U.S. Cl. .............................. 379/88.03; 379/201.01; 379/207.01; 704/270; 709/224

(58) Field of Classification Search ............. 379/88.01, 379/201.02, 88.03, 201.01, 207.01; 709/201, 709/224; 704/275, 270
See application file for complete search history.

(56) References Cited

U.S. PATENT DOCUMENTS 4,831,438 A 5/1989 Bellman et al.
5,053,868 A 10/1991 Higgins et al.
5,758,079 A 5/1998 Ludwig et al.
5,867,494 A 2/1999 Krishnaswamy et al.
5,905,988 A 5/1999 Schwartz et al.
5,987,454 A 11/1999 Hobbs
6,064,963 A 5/2000 Gainsboro
6,067,095 A 5/2000 Danieli
6,115,455 A 9/2000 Picard
6,137,864 A 10/2000 Yaker
6,192,111 B1 2/2001 Wu
6,192,342 B1 2/2001 Akst
6,233,313 B1 5/2001 Farris et al.
6,243,676 B1 6/2001 Witteman
6,246,933 B1 6/2001 Bague
6,278,772 B1 8/2001 Bowater et al.
6,278,992 B1 8/2001 Curtis et al.
6,289,382 B1 9/2001 Bowman-Amuah
6,327,343 B1 12/2001 Epstein et al.
6,377,663 B1 * 4/2002 Thurber .................. 379/88.03
6,404,856 B1 6/2002 Wilcox et al.

(Continued)

*Primary Examiner*—Gerald Gauthier
(74) *Attorney, Agent, or Firm*—Theodore A. Chen; Krishnendu Gupta

(57) ABSTRACT

A method, article of manufacture, and apparatus for automated processing of an auditory communication is disclosed. In an embodiment, this comprises receiving the auditory communication with call transport information, triggering a first policy based on the data, and selecting, based on the first policy, at least a first lexicon comprising a plurality of keywords. A first portion of the call is compared to the first lexicon to identify keywords matched by the first portion of the call, and a second policy is invoked based on the matched keywords. The action(s) specified by the second policy is taken. Actions may include termination of the call, joining a third party, archiving the call, changing a characteristic of the call, or further processing using another lexicon.

19 Claims, 5 Drawing Sheets

Receive call and call transport metadata
113
Determine applicable policy based on metadata
114
Apply policy, including choosing lexicon(s)
115
YES
Analyze call and identify keywords that are present or absent
116
Take action in accordance with policies triggered by keywords
117

U.S. PATENT DOCUMENTS 6,438,594 B1 8/2002 Bowman-Amuah
6,522,727 B1 2/2003 Jones
6,539,077 B1 3/2003 Ranalli et al.
6,539,354 B1 3/2003 Sutton et al.
6,542,500 B1 4/2003 Gerszberg et al.
6,542,602 B1 4/2003 Elazar
6,549,949 B1 4/2003 Bowman-Amuah
6,633,835 B1 10/2003 Moran et al.
6,661,879 B1 12/2003 Schwartz et al.
6,662,178 B2 12/2003 Lee
6,697,796 B2 2/2004 Kermani
6,721,706 B1 4/2004 Strubbe et al.
6,728,679 B1 4/2004 Strubbe et al.
6,731,307 B1 5/2004 Strubbe et al.
6,732,090 B2 5/2004 Shanahan et al.
6,772,125 B2 8/2004 Harradine et al.
6,781,962 B1 8/2004 Williams et al.
6,784,899 B1 8/2004 Barrus et al.
6,795,808 B1 9/2004 Strubbe et al.
6,807,574 B1 10/2004 Partovi et al.
6,862,566 B2 3/2005 Wakita et al.
6,889,232 B2 5/2005 Pudipeddi et al.
6,934,756 B2 8/2005 Maes
6,937,986 B2 * 8/2005 Denenberg et al. .......... 704/275
6,961,763 B1 11/2005 Wang et al.
6,961,954 B1 11/2005 Maybury et al.
6,968,364 B1 11/2005 Wong et al.
7,007,048 B1 2/2006 Murray et al.
7,039,585 B2 5/2006 Wilmot et al.
7,069,291 B2 * 6/2006 Graves et al. ............... 709/201
7,191,133 B1 3/2007 Pettay
2001/0036821 A1 11/2001 Gainsboro et al.
2001/0038624 A1 11/2001 Greenberg et al.
2001/0055372 A1 12/2001 Glowny et al.
2002/0002460 A1 1/2002 Pertrushin
2002/0105598 A1 8/2002 Tai et al.
2002/0110264 A1 8/2002 Sharoni et al.
2002/0122113 A1 9/2002 Foote
2002/0143797 A1 10/2002 Zhang et al.
2003/0018531 A1 1/2003 Mahaffy et al.
2003/0058277 A1 3/2003 Bowman-Amuah
2003/0074404 A1 4/2003 Parker et al.
2003/0078973 A1 4/2003 Przekop et al.
2003/0112259 A1 6/2003 Kinjo
2003/0120390 A1 6/2003 Hopkins
2003/0182387 A1 9/2003 Geshwind
2003/0236788 A1 12/2003 Kanellos et al.
2004/0010415 A1 1/2004 Seo et al.
2004/0030741 A1 2/2004 Wolton et al.
2004/0127286 A1 7/2004 Fujimoto
2004/0167890 A1 8/2004 Eyal
2004/0199494 A1 10/2004 Bhagg
2004/0199566 A1 10/2004 Carlson et al.
2004/0203577 A1 10/2004 Forman et al.
2004/0235520 A1 11/2004 Cadiz et al.
2004/0247086 A1 12/2004 Menard et al.
2005/0131559 A1 6/2005 Kahn et al.
2006/0010150 A1 1/2006 Shaath et al.

* cited by examiner

| Inbound Call Processing | |
|---|---|
| **Condition** | **Action** |
| Call Received (ring, trunk/line ANI) | Check/Apply Policies |
| Call Setup (answer, station ID) | Check/Apply Policies |
| User ID (optional) | Check/Apply Policies |
| Call Commenced (connect) | Apply Policies Cache Call |
| Call Disconnected | Post Call Policy Completion |

FIG. 9

| Outbound Call Processing | |
|---|---|
| **Condition** | **Action** |
| Call is initiated (off hook) | Check/Apply Policies |
| User Identified (optional) | Check/Apply Policies |
| Call Setup (line or trunk selection & dialing) | Check/Apply Policies |
| Call Commenced (connect) | Apply Policies Cache Call |
| Call Disconnected | Post Call Policy Completion |

FIG. 10

AUTOMATED CALL MANAGEMENT

CROSS REFERENCE TO RELATED APPLICATIONS

This application claims priority to co-pending U.S. patent application Ser. No. 60/500,453 entitled VOICE MESSAGE PROCESSING, filed Sep. 5, 2003, which is incorporated herein by reference for all purposes. This application is related to co-pending U.S. patent application Ser. No.10/884,453 for METHOD AND SYSTEM FOR PROCESSING AUDITORY COMMUNICATIONS and filed concurrently herewith, which is incorporated herein by reference for all purposes; co-pending U.S. patent application Ser. No.10/884,477 for MESSAGE INDEXING AND ARCHIVING and filed concurrently herewith, which is incorporated herein by reference for all purposes; and co-pending U.S. patent application Ser. No.10/884,345 for METHOD AND SYSTEM FOR INFORMATION LIFECYCLE MANAGEMENT and filed concurrently herewith, which is incorporated herein by reference for all purposes.

FIELD OF THE INVENTION

This invention relates generally to auditory communications. More particularly, processing, archival, and management of auditory communications is disclosed.

BACKGROUND

Companies, particularly in the finance, insurance, and healthcare fields, record some or all of the telephone conversations between their employees and their clients for evidence in case of a dispute. For example, a stock brokerage company may record thousands of conversations a year, mainly the details of customer transactions conducted over the telephone, to ensure that the execution of the customers' orders are consistent with the customers' spoken orders. It has become increasingly important for corporations to keep track of communications between employees and between employees and the corporation's customers and/or the public. The requirements of the SEC, NASD, HIPAA, Sarbanes-Oxley Act of 2002, and various anti-harassment and anti-discrimination laws put further pressure on corporations to have the ability to monitor, record, archive, index, retrieve, and control employee communications.

Traditionally, such conversations are recorded as voice/sound recordings on various recording media. Such conversations can also then be associated with individual customer records and retrieved if necessary. Recently, compression techniques have been put to use in order to decrease the amount of recording media required to capture and archive such recordings.

Voice data presents many challenges and problems to companies who plan to use it for reasons of compliance and content control. In order to locate recordings of telephone conversations with potentially non-compliant language, it would require near real-time playback while someone listens for the non-compliant language. It also makes it very difficult to monitor or identify compliance violations prior to a complaint. In the case of a complaint, the complainant would provide the approximate time and date which would narrow the scope of the search. Monitoring conversations for non-compliant language requires near real-time monitoring of all conversations. This takes considerable time, effort and cost.

It is very difficult for companies to keep track of employee telephone conversations because telephone conversations have substantial storage requirements and are difficult and time consuming to analyze for non-compliant communication and language, or a particular communication.

Many companies now use Voice over Internet Protocol (VoIP) networks to place and receive telephonic communications rather than solely using the traditional Public Switched Telephone Network (PSTN.) In VoIP networks, telephone voice conversations are converted to data that is compatible with IP networks. Once converted, the data can be switched and routed as any network data. When conversations are recorded, they are stored as voice messages that must be processed manually to determine whether they contain non-compliant communication and language, or a particular communication. Such processing is expensive and time-consuming, requiring considerable human intervention.

There is a need, therefore, for an improved method, article of manufacture, and apparatus for monitoring, recording, archiving, indexing, retrieving, processing, and managing communications in the form of voice messages.

BRIEF DESCRIPTION OF THE DRAWINGS

The present invention will be readily understood by the following detailed description in conjunction with the accompanying drawings, wherein like reference numerals designate like structural elements, and in which:

FIG. 9 is a table illustrating inbound call processing; and

FIG. 10 is a table illustrating outbound call processing.

DESCRIPTION OF THE INVENTION

Figure 1:
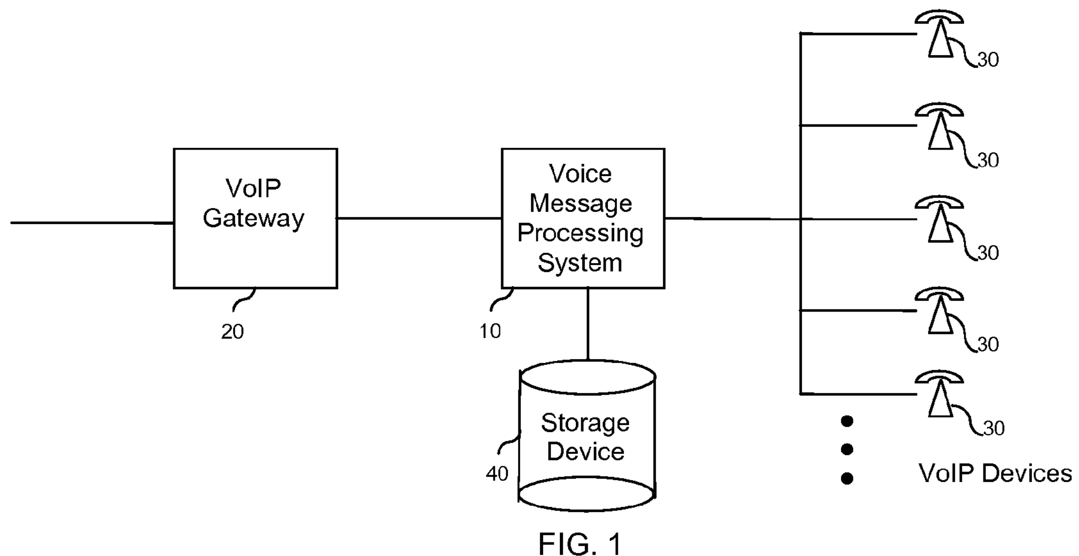
FIG. 1 is a diagram of a voice message processing system being used with a VoIP network.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. A general purpose computer system such as an Intel-based processor running Microsoft Windows or Linux may be used, or a specialized appliance could be used. In this specification, these implementations, or any other form that the invention may take, may be referred to as techniques. In general, the order of the steps of disclosed processes may be altered within the scope of the invention.

An embodiment of the invention will be described with reference to a voice message processing system, but it should be understood that the principles of the invention are not limited to voice messages. Rather, they are applicable to any auditory communication capable of conveying meaning. Further, they are not limited to communications consisting solely of auditory communications, but can be used with any communication comprising an auditory component, including but not limited to videoconferences, video broadcasts, radio broadcasts, cell phone communications, wired communications, VoIP-based communications, digital communications, analog communications, and video-phone communications. Although the concepts herein are described with respect to a VoIP network, it should be understood that they are not limited to a VoIP network. Rather, they are applicable to any network or transmission means capable of conveying auditory communication, such as PSTN (Public Switched Telephone Networks) and POTS (Plain Old Telephone Service) services, and such communication may be conveyed in analog or digital form.

Disclosed herein are a method and system to comprehensively monitor, record, archive, index, retrieve, perform auditory data-to-text processing, control data representing auditory communications made over a communication connection and their control data, consolidation and control of these data with other communications made to and from the same entity, and to manage the ultimate disposition of the archived and live communications. In particular, the foregoing will be described with respect to a VoIP network conveying auditory communications in the form of telephone conversations (calls). The method comprises receiving VoIP data from the network representing the telephone conversation and the control elements of the connection and performing a series of optional processes on the data in order to monitor its content (its linguistic meaning), record the data, archive the recorded data, index the content of the conversation, retrieve the recorded data from the archive, and control the progress of the data traffic that supports the telephone conversation (e.g., terminate a call if a non-compliant conversation is taking place or if communication with an unauthorized person or entity is attempted). Such a solution makes use of network-data-to-text processing for identification of key words or phrases and/or for conversion of the entire data set/traffic representing telephone conversations into text.

Figure 2:
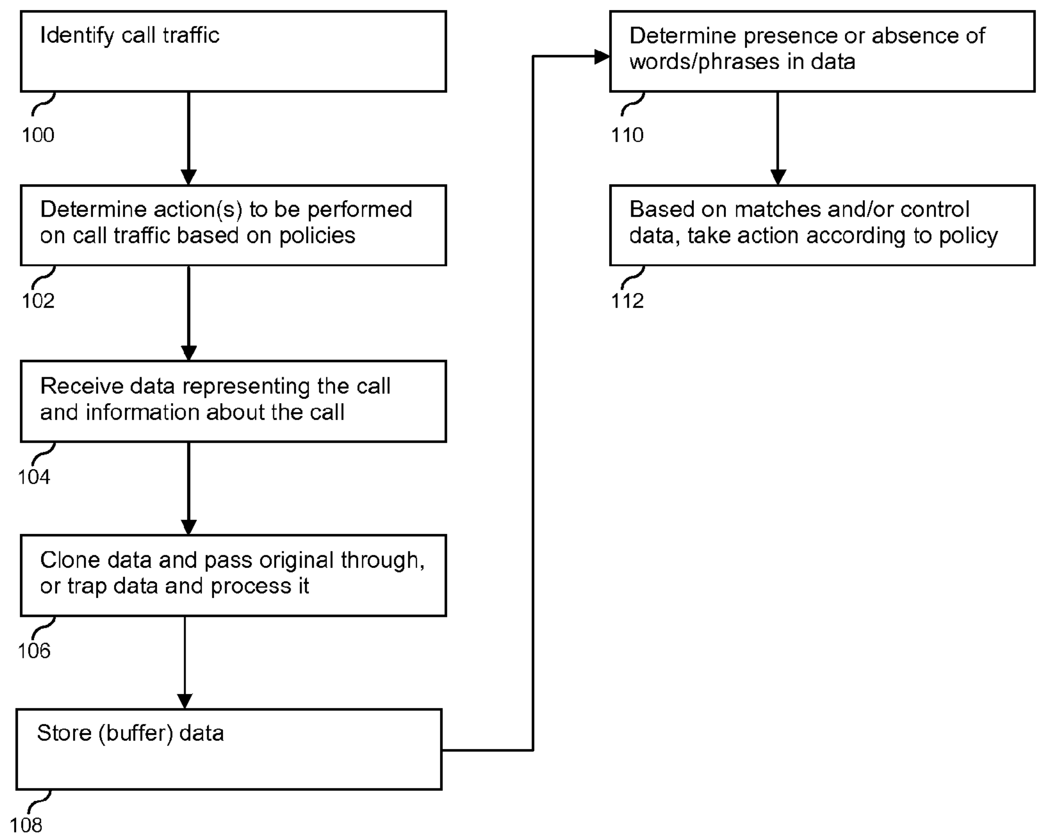
FIG. 2 is a flowchart illustrating operation of the voice message processing system.

FIG. 2 illustrates the method. The method may be implemented in a network appliance system configured to identify VoIP network traffic, step 100, determine the course of action(s) to be performed on the VoIP traffic based on predefined or dynamic policies, step 102, receive VoIP network data representing the voice and control portions of the telephone conversation, step 104, clone or "tap" the data so that the flow of data between source and destination is unimpeded or trap the traffic and perform further processing before permitting its passage and/or cloning, step 106, and store the data in its native format or in any other changed format to a storage medium together with other relevant information (such as source IP address, destination IP address, time, date, caller ID, agent ID, duration of call, location of agent, location of caller, station ID, etc.), step 108.

The system may scan the network data representing the voice portion of the network traffic for the presence or absence of keywords and/or phrases through a network-data-to-text processing system, step 110, or convert the entire data set/traffic representing telephone conversations into text, optionally index the recorded data and the associated text ("Conversation Text") from the network-data-to-text process, store the text from the network-data-to-text process, and compare the Conversation Text to a predefined lexicon of words and/or phrases. Based on positive matches and/or negative matches (lack of match), the system may take specific action as determined by the appropriate policy, step 112. This may also be determined by reference to control data. For example, such actions include but are not limited to termination of the call, notification of specific third parties, dynamic connection with and intervention of third parties and so on. Some or all of the foregoing elements may be utilized in accordance with the principles of the invention. The system may compare the data to a lexicon containing auditory representations of words directly, without first converting the entire data set/traffic into text.

This approach provides complete control, recording, archiving, retrieval, and analysis of VoIP network traffic. It also provides a means of associating VoIP network traffic with communications made using other media such as email, instant messenger, etc. by the same parties.

In an embodiment, a voice message processing system is used to process auditory communications in the form of telephone calls. The voice message processing system may comprise a processor in the form of a computer system, configured to receive voice messages from a source of voice messages, such as telephone system, a voice mail system, or a line monitor. Multiple network interface cards may be used to connect the voice message processing system to the VoIP network. The voice message processing system may be integrated with the function of the VoIP system/gateway, or be a standalone system to which the VoIP system passes data. The voice message processing system may be attached to the VoIP network and its functionality invoked when explicitly instructed by a user/administrator or system-based policy. This may be added externally to VoIP systems or made an integral element of a VoIP system. This may also be added as a VoIP device 30, and could be integrated with the telephone, and more than one may be used in a VoIP network.

A variety of methods for intercepting and/or monitoring calls may be used, to give the voice message processing system access to the call content. The voice message processing system may be configured to operate and perform its functions at the point in the network where all VoIP traffic is processed such as the VoIP gateway, gatekeeper, server, and/or switch. This central point provides access to all VoIP traffic regardless of their source or destination (i.e. internal and external calls can be processed).

FIG. 1 illustrates an embodiment of a voice message processing system in use with a VoIP system. Voice message processing system 10 is connected to a VoIP gateway 20. VoIP gateway 20 may be a gateway, server, switch, or other point through which VoIP traffic passes. Voice message processing system 10 is connected to VoIP devices 30, which may be telephones or other devices that communicate via VoIP. Storage device 40 is attached to voice message processing system. There may be more than one VoIP gateway 20 connected to voice message processing system 10, and there may be more than one voice message processing system 10. Voice message processing system 10 may be combined with VoIP gateway 20. Multiple connections may be used between the various elements in FIG. 1, though single lines are shown for brevity. Storage device 40 may comprise multiple storage devices, and may be connected to the network rather than directly attached to voice message processing system 10.

In this configuration, the voice message processing system is inline with the flow of VoIP traffic to the central VoIP handling system (such as the VoIP gateway/server/switch). This configuration may be added to VoIP systems through external means without change to the VoIP system, other than the addition of the voice messaging system inline with the flow of VoIP data. VoIP data may be identified by scanning the headers of IP packets on the network, or by knowing the IP address, MAC address, or port of the various VoIP devices on the network and scanning packets going to and from those devices. A VoIP network switch may be configured to send a duplicate copy of a communication stream to the voice message processing system, while permitting the original communication stream to continue to its destination, thus cloning or "tapping" the data stream. The duplication of IP packets can be done either in hardware or software. The switch may also be configured to redirect the original communication stream to the voice message processing system, which may pass the original communication stream to its destination after analyzing and processing it.

Call setup metadata may be passed to the voice message processing system, and this metadata may vary depending on the call transport method. The call transport information may include information such as Automatic Number Identification (ANI) of the calling party, Station ID, time of day, call time (elapsed time), User ID, transport protocol, trunk ID, line ID, Class of Service, Quality of Service, Source Address (SA), Destination Address (DA), etc.

The voice message processing system identifies keywords within a call, in order to generate additional metadata that provides additional information and characterization of the content of the call. A keyword is an auditory element or representation of an audio element, text element, or both, and may be a spoken word or utterance but is not limited to speech. The keyword may be found in a lexicon kept by the system, and more than one lexicon may be used by the system. Although several lexicons may be used, it should be understood that they may be referred to collectively as constituting a single lexicon. The keyword identification can be done by the system itself or an ancillary system in communication with the voice message processing system. Automatic Speech Recognition (ASR) systems attempt to provide a complete transcription of a call through the use of Speech-to-Text (STT) technology which renders the entire call content (when it comprises speech) into text. The keyword may be directly derived from the call data or extracted from the rendered text.

The performance of keyword/phrase scanning and/or speech-to-text processing can be optionally performed in real-time or deferred for later processing. This would be determined by policy or administrator settings/preferences. For purposes of review for accuracy, the conversation text and telephone recording can be indexed to each other. In this way, a comparison can be made between the recording and the conversation text. A signature (hash or hash digest) of the text, recording, and metadata may also be added to the metadata for purposes of non-repudiation.

Figure 3:
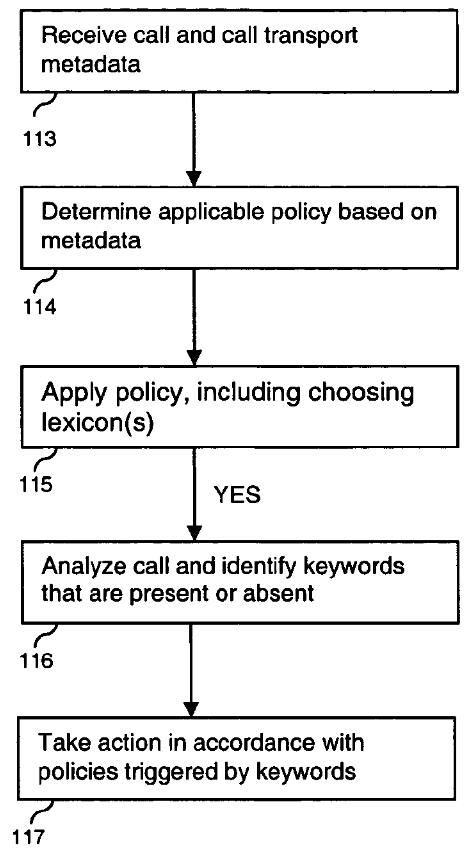
FIG. 3 is a flowchart illustrating processing of an auditory communication using policies.

Referring now to FIG. 3, an embodiment of the process can be described as follows: receive the call and its call setup (transport) metadata, which may include caller ID, station ID, line, time of day, etc., step 113. Based on the metadata, select the applicable policy, step 114. The policy is applied in step 115. This may include selecting the lexicon(s) to be used in analyzing the call content. Using the keywords from the lexicon(s), search the call and identify any keywords that are present, step 116. In step 117, action is taken in accordance with any policies invoked by the keyword matches and/or non-matches. These actions may include archiving the call, loading additional policies/lexicons for further analysis, adding a third party (person or system) to the call, terminating the call, adjusting the characteristics of the call, creating metadata describing call content, policies invoked, and actions taken, etc.

Figure 4:
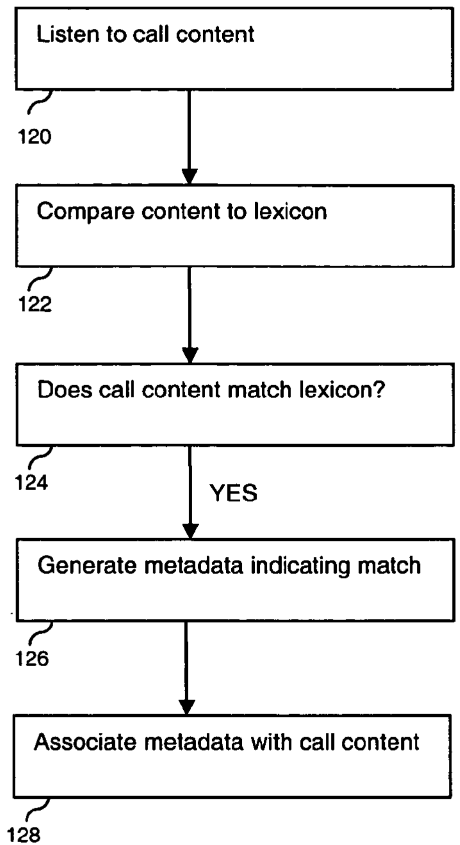
FIG. 4 is a flowchart illustrating processing of an auditory communication and using metadata to track matched keywords.

In an embodiment, shown in FIG. 4, rather than attempting to render the call content to text or perform a STT process to render the call's content to text, the voice message processing system may listen to the call's content, step 120, and compare the content to a list of elements specified in a lexicon that comprises a group of data elements consisting of auditory elements or representations of audio elements (keywords) associated to text or other data elements, step 122. Upon detection of call content that matches lexicon content, step 124, metadata may be generated in step 126 and associated with the call content in step 128. Such metadata may be the text equivalent of the auditory content or it may be a pointer to other data held within the lexicon.

The system can search for keywords in the auditory communication that positively match keywords in the lexicon. The search for keywords within a call may further specify:

- The order of the appearance/sequence (e.g., "Buy" followed by "Stock")
- Specific inter-keyword distance ("Buy" followed by "Stock" as the next word)
- The number of repetitions within a timeframe or communication session
- The inverse of the above:
  - Keywords are present but not in the specific sequence
  - Keywords are present but not within the inter-keyword distance
  - Keywords are present but not repeated within specification
- The absence of the keyword(s); i.e. a non-match or negative match
- Groups of keywords Keywords (including the tests described herein) may be used to determine whether the call should be archived, to determine whether the call is violating a compliance policy such as Sarbanes-Oxley and if a prescribed action should be taken, and to affect changes to the progress and/or control of the call and/or the call's characteristics. Metadata such as the call setup metadata may be used in conjunction with the keywords to determine what actions to take. This may be defined through the use of triggering policies, which identify the criteria upon which a set of actions or policies should be executed or invoked. The voice message processing system can be configured to chain policies together. Policies may be dynamic; i.e, a policy may be invoked by another policy.

For example, metadata might indicate that a call is a customer service call. This would trigger a policy for handling customer calls. The company might have a requirement that all customer service representatives say "Thank you for calling XYZ. We appreciate your business." A negative match may be used to determine when a representative is not in compliance with this requirement (i.e. neglects to thank the customer for calling and express appreciation). If a negative match is found, another policy may be invoked to archive the call and flag it for review by a supervisor. This system could be used to alleviate the need for constant monitoring of phone calls by supervisors.

In an embodiment, if the voice message processing system determines that a call contains certain keywords, it may activate a policy that requires archiving of the call, and also activate a policy that requires archiving all subsequent calls between that caller and called party for the next 30 days. The system may also track information from one call to another, such as determining that a caller frequently uses certain keywords in every call. Thus, if a caller frequently said "buy stock" or "dump stock" in several consecutive phone calls, this pattern could be flagged for review by the voice message processing system.

Figure 5:
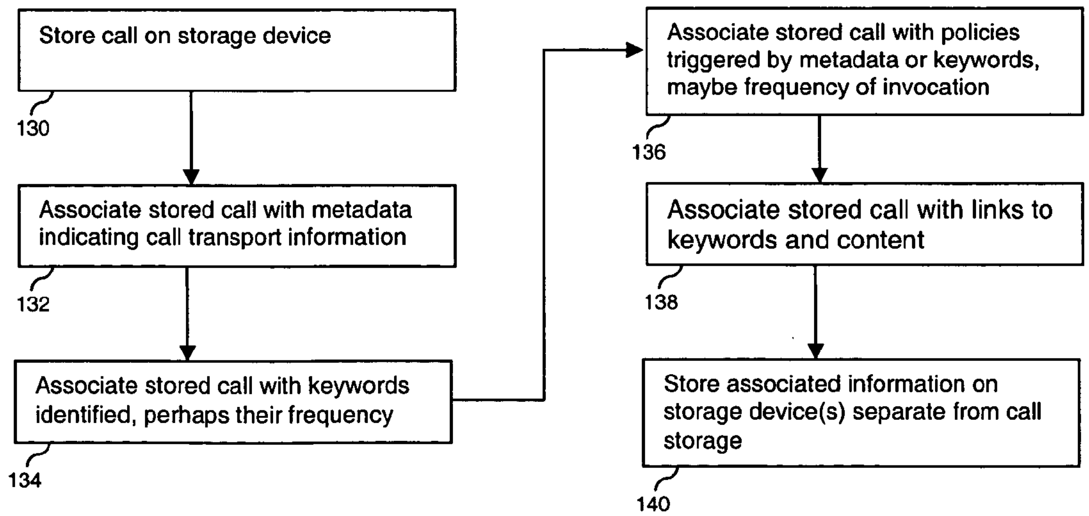
FIG. 5 is a flowchart illustrating archival of an auditory communication.

Archiving the call is shown in FIG. 5. If the voice message processing system determines from the keywords that the call should be archived, it can store the call on its storage device 40, step 130, or direct the call content to a voicemail system for storage. The voice message processing system may store the associated metadata with the call, step 132. The metadata may be used in machine-assisted searches to identify and retrieve archived calls that match desired parameters. Thus, the voice message processing system may be used to identify keywords in a call, and based on the presence of those keywords and possibly the associated metadata, determine that a call is to be archived somewhere. Metadata indicating the presence and frequency of the identified keywords would be included with the archived call to facilitate later search and retrieval, step 134. The metadata could contain pointers to the keywords in the lexicon, or the metadata could contain the keywords themselves.

In an embodiment, the call may be archived with metadata indicating which policies were triggered, step 136, such as by including the policy ID, the policy signature (hash), message signature (hash), index, or pointers to specific elements within the policy that are applicable to the triggering message. A policy may be invoked more than once, and its frequency of invocation could be recorded in the metadata. Other metadata may also be included, such as the caller ID, the called party ID, the time and date the message was received, inspected, or forwarded, and message length. Also included may be a hyperlink, pointer, or index the keywords into corresponding parts of the recorded call to the keywords and relevant portions of the call, step 138.

The recording media for archival may be selected by the user/administrator or policy. For example, VoIP network data (including the call), metadata, and call text (if any) may be recorded to "write once read many" (WORM) media, re-recordable media, erasable media, solid state recording media, etc. EMC Centera, available from EMC Corporation, is a magnetic disk-based WORM device that is well-suited for storing such data. Selection of media and location of the media are determined by the requirements of the user/administrator and the purpose of the recording. In cases of compliance issues where the recordings are used for legal purposes such as evidence in a court of law, the media chosen would be specified by law. In these cases, nonvolatile, write once media that reside at an off-site location (possibly stored with a third party acting as an escrow agent) may be used. The user/administrator or policy can specify multiple and varied forms of media. The various types of call metadata may be stored on separate storage devices from the call content itself, step 140.

The voice message processing system is not limited to the specific examples of architecture of the network-data-to-text processing system or the storage system used for the voice and text data. It is applicable to tape storage and all other data storage devices.

All calls may be archived automatically, and the voice message processing system could store any identified keywords with each call to indicate that those keywords were found in that call.

Other call processing may be performed together with or separately from archival. For example, a call may be quarantined when keywords are identified that are predefined as requiring additional analysis. The call may be archived with metadata indicating the presence of the keywords and that the recorded call is classified as a quarantine call. This decision may be based solely on the presence of the keywords, or it may take into account call setup metadata such as the identity of the calling party or identity of the called party.

Figure 6:
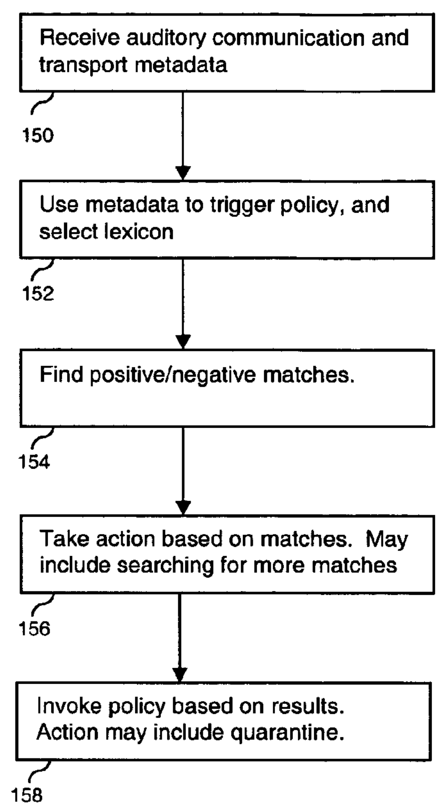
FIG. 6 is a flowchart illustrating the operation of policies, keywords, and metadata to process auditory communications.

An embodiment is illustrated in FIG. 6. A call and its call transport metadata are received in step 150, and policies are invoked based on the metadata, step 152. This may include selecting a lexicon or group of lexicons to use. The call is compared to the lexicon to determine whether positive or negative matches to the keywords are present in the call, step 154. The policies are used to determine the proper action based on the positive and negative matches found, step 156. The specified action may include searching for additional keywords in the call. Policies may be invoked by the resulting positive and/or negative matches, and their specified actions executed (such as quarantining the call), step 158.

Upon a call's classification as a quarantine call, a human operator or machine system may be notified, and the call may be made available for further analysis and processing. For example, a call containing keywords that trigger quarantine could be routed to a human operator for listening in real time, while the call is still taking place. This would require the voice message processing system to be processing live calls.

Additional metadata regarding the notification is created and added to the quarantined call's metadata, such as the date of notification, required response time/date, triggering policy and keywords, message ID, identity of the notified parties, etc. As the quarantined call is processed through a work flow (for review, approval, etc.), the associated metadata is appended to the quarantined call's metadata and retained until a defined expiration date, if any.

Figure 7:
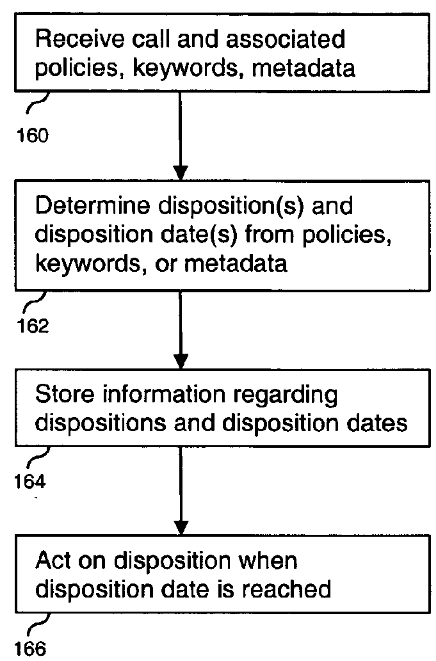
FIG. 7 is a flowchart illustrating the use of dates to control post-storage processing of an auditory communication.

The voice message processing system can be configured to retain archived and quarantined calls until a specified disposition date, which may be determined by keywords identified in the call or policies invoked by the call. An embodiment is illustrated in FIG. 7. For example, after the system receives the call, step 160, a routine call might be retained for 90 days, but if the call contains certain triggering keywords or triggers certain policies, the call might be retained for seven years. Metadata relating to call transport may also be used by the system to determine the disposition and disposition date. Step 162. The disposition(s) and disposition date(s) may be stored with the call or separately from the call, step 164. Upon reaching the disposition date (or expiration date), the stored call and associated metadata may be partially or completely destroyed, step 166. Other types of processing and disposition may be invoked upon reaching the expiration date, such as hierarchical storage management functions (e.g., moving the data from disk drive media to optical or tape media), bit rate, encryption, application of digital rights management services, service level agreements, and other services associated with information lifecycle management. This processing may be performed by the voice message processing system or other system.

The quarantine function may be used to pro-actively monitor calls for violations of Sarbanes-Oxley, HIPAA, SEC, NASD, corporate, and other laws, regulations, and policies.

For example, if a call contained the words "buy" and "stock" within one word of each other, the call would be quarantined with metadata indicating that the words "buy" and "stock" were found in the call within one word of each other.

Call control is based on identifying, in real-time (during the call), the presence or absence of keywords triggering specific policies that result in actions that control the call's characteristics and handling. As the call is in progress, the voice message processing system may remain active and listen for specific keywords that are associated with actions other than archive and quarantine. Such actions may control the progress, quality, and characteristics of the call. For example, if any of the call parties say the keywords "I can't hear you," a policy could activate an action which would signal the calling system equipment to increase the volume of the auditory portion of the call, change communications channels, increase bandwidth allocated to the call, alter the transport (intermediate routing) of the call, or take other measures to improve the auditory quality of the call.

Specific keywords can be known by the callers and deliberately spoken in order to invoke a desired policy. For example, the caller could say, "Operator, call Bob Smith," and the policy that is triggered by the keywords initiates actions that cause the calling equipment to add the requested party to the call. Other examples of call control are termination of the call, conferencing other parties to the call, encryption of the call, dropping specific parties from the call, accessing the public announcement system, adding a human or machine monitor to the call, etc. Call control can also be used to intentionally invoke a recording of the call (example: the caller says, "Operator, record this call," which the voice message processing system identifies as a request to archive the call.

Figure 8:
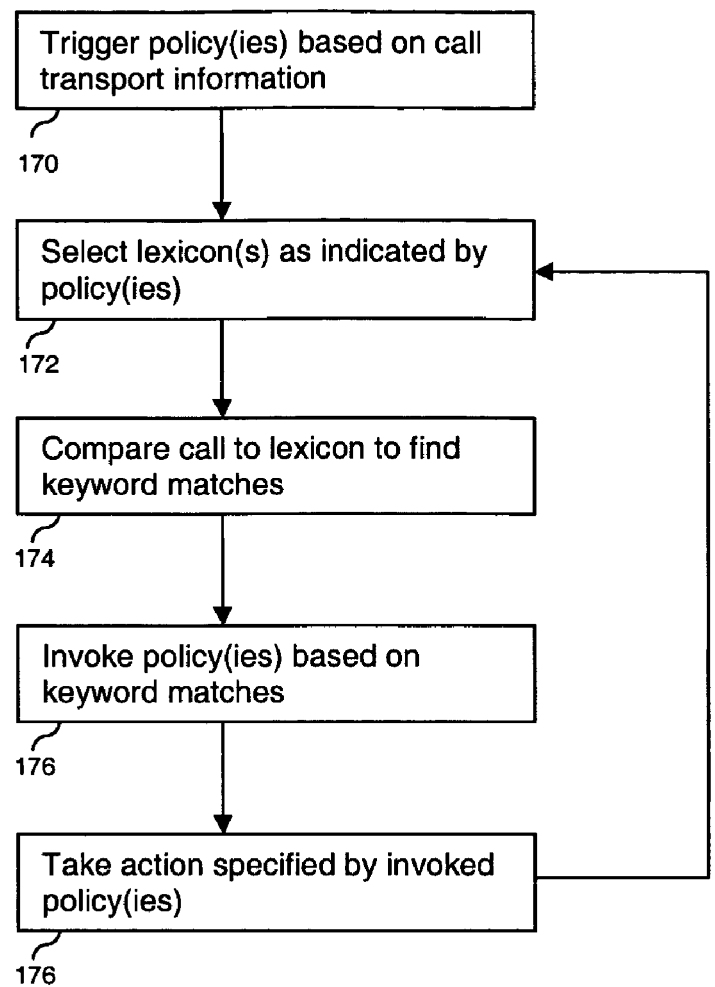
FIG. 8 is a flowchart illustrating call management.

In an embodiment, call management may entail using the call transport metadata to trigger a policy, as shown in step 170 in FIG. 8. The policy may identify the lexicon(s) to be used, step 172, and the call is compared to the lexicon(s) to find keyword matches, step 174. The keyword matches (whether positive or negative) are used to invoke policies, step 176, and the actions specified by the policies are executed. One such action might be to begin archiving the call, and continue monitoring the call with a new lexicon. In this case, the process would loop back to step 172, in which a lexicon is selected, and call processing could continue as before.

An example of processing an inbound call is illustrated in FIG. 9. As shown, a call is initiated when the caller goes off-hook. A trigger policy is invoked and compared to the available information. The voice message processing system obtains certain information such as station ID, line card selected, time of day, and date. This information is used to determine if a trigger policy is applicable. The trigger policy would specify which policies, if any, are applicable to the call based on the information available at that point.

The caller and/or call recipient may optionally be required to enter his/her ID code (PIN) in order to identify himself/herself. Another trigger policy is invoked to determine which, if any, policies are applicable.

The call setup is performed, meaning that the caller secures a trunk (outside line) and dials a number or the caller begins dialing immediately (making an internal call). Based on the information from the call setup, a trigger policy is invoked, and it is determined which policies are applicable given all of the previous information and the new information (such as external trunk ID, internal line ID, caller ID).

The call commences, meaning that the caller's request to complete the connection to the called party is attempted. If the call setup is successful, the caller and the called party are connected and begin their communication. The policies affecting the communication session are enacted. If the call setup is not successful (such as a busy signal or no answer), the policies that would apply to a successful call setup are not enacted, but the attempt and associated metadata may optionally be archived.

When the call is disconnected, post-call actions are performed in accordance with the actions specified in the applicable policies. For example, if a call would not normally be archived or quarantined based on the station ID, caller ID, called party ID, etc., but during the call restricted speech is used and certain keywords are detected, then the cached call would be quarantined. If no restricted speech was used during the call then the call would not be quarantined or archived and the cache would be cleared (deleted). A record of the call and the resulting outcome of the analysis could be optionally archived with the metadata.

The processing of an outbound call is illustrated in FIG. 10. A call is received and the phone rings. A trigger policy is invoked and compared to the available information. The voice message processing system receives certain information such as ANI, trunk port, station ID, line card selected, time of day, and date. This information is used to determine whether a trigger policy is applicable. The trigger policy would specify which policies, if any, are applicable to the call based on the information available at that point.

The called party answers the telephone and the call setup is performed. Based on the information from the call setup, a trigger policy is invoked and it is determined which policies are applicable given all of the previous information and the new information (external trunk ID, trunk port, internal line ID, etc.).

The called party may be optionally required to enter his/her ID code (PIN) in order to identify himself/herself. Another trigger policy is invoked to determine which, if any, policies are applicable.

The call commences, meaning that the caller's request to complete the connection to the called party is completed. If the call setup is successful, the caller and the called party are connected and begin their communication. The policies affecting the communication session are enacted.

If the call setup is not successful (such as a busy signal or no answer), the policies that apply to a successful call setup are not enacted.

The call is disconnected, and post-call actions are performed depending on the actions specified in the applicable policies. For example, if a call would not normally be archived or quarantined based on the Station ID, caller ID, called party ID, etc., but during the call restricted speech is used and certain keywords are detected, then the cached call would be quarantined. If no restricted speech was used during the call then the call would not be quarantined or archived and the cache would be cleared (deleted).

The voice message processing system may be used in real-time such as during a call, or applied to recordings of auditory communications. It is not limited to communication systems utilizing a centralized server, switch, exchange, etc., but may also be used with non-centralized and peer-to-peer networks and communications. Additionally, the voice message processing system can be used to control the flow, routing, bandwidth, CoS, QoS, security, encryption, and duration of calls made via VoIP systems based on matches to the Lexicon. For example, encryption of the call could be based on the identity of the call parties and matches to the lexicon.

Telephone conversations may be recorded, processed into text (speech-to-text), and then formatted for delivery to an email archive and management system, such as LEGATO EmailXtender, EmailArchive, or EmailXaminer, available from EMC Corporation, for later retrieval, analysis, and other disposition. The data objects that are held in the EmailXtender/EmailArchive/EmailXaminer system (Legato Information Lifecycle Management System or like system) are voice, the voice-to-text transcription of the conversation, and other metadata such as the source/destination information of the caller and called party, station ID, time of call, time of call termination, caller ID, keywords found, etc. The VoIP call data elements (and their derivative elements) may be packaged in such as way as to make them manageable by email systems and email management systems such as Microsoft Exchange, Microsoft Outlook, and LEGATO EmailXtender.

The presentation to the user of this information may be through an email client application, and have a front-end appearance to the user of an email message in the Inbox. The relevant call information (text, voice recording, metadata, etc.) may be contained within this pseudo-message, with hyperlinks or other references to the auditory portions of the call containing keywords and relevant portions. The user may use these links to confirm that certain keywords were found and to understand the context (such as to determine whether a law or regulation has been violated).

Users and administrators could easily and quickly archive, retrieve, analyze, sort, and filter hundreds of thousands of telephone conversations in the same manner they handle email messages.

Compared to simply sending a voice recording of a telephone conversation to an email recipient (the recording will be treated by the email server as an attachment), this approach would allow the system to detect and understand that the attachment is a voice recording and process it in a completely different manner than typical email messages with attachments.

Although the methods and systems herein have been described with respect to an illustrative embodiment, it should be appreciated that the methods and systems disclosed are independent of the precise architecture of the network-data-to-text processing system or the storage system used for the voice and text data, and are applicable to tape storage, optical devices, and all other types of data storage. The principles are equally applicable to VoIP, PSTN, PBX, digital, analog, and all other systems useful for auditory communication.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method of managing a call having associated data representing call transport information, comprising:
- triggering a first policy based on the data;
- selecting, based on the first policy, at least a first lexicon comprising a plurality of keywords;
- comparing at least a first portion of the call to the first lexicon to identify keywords matched by the first portion of the call;
- invoking a second policy based on the matched keywords; and
- taking an action specified by the second policy.

2. The method as recited in claim 1, wherein the match is positive or negative.

3. The method as recited in claim 2, wherein the action includes termination of the call.

4. The method as recited in claim 2, wherein the action includes joining a third party to the call.

5. The method as recited in claim 2, wherein the action includes archiving the call.

6. The method as recited in claim 2, wherein the action includes changing a characteristic of the call.

7. The method as recited in claim 6, wherein the characteristic comprises at least one of the group comprising volume, routing, bandwidth, and priority.

8. The method as recited in claim 1, wherein the action includes selecting at least a second lexicon.

9. The method as recited in claim 8, further comprising comparing at least a second portion of the call to the second lexicon to identify keywords further matched by the second portion of the call.

10. The method as recited in claim 9, further comprising invoking a third policy based on the further matched keywords.

11. The method as recited in claim 10, further comprising taking an action specified by the third policy.

12. A system for managing a call having associated data representing call transport information, comprising a computer configured to:
- trigger a first policy based on the data;
- select, based on the first policy, at least a first lexicon comprising a plurality of keywords;
- compare at least a first portion of the call to the first lexicon to identify keywords matched by the first portion of the call;
- invoke a second policy based on the matched keywords; and
- take an action specified by the second policy.

13. The system as recited in claim 12, configured to identify positive or negative keyword matches.

14. The system as recited in claim 13, wherein the action includes termination of the call.

15. The system as recited in claim 13, wherein the action includes joining a third party to the call.

16. The system as recited in claim 13, wherein the action includes archiving the call.

17. The system as recited in claim 13, wherein the action includes changing a characteristic of the call.

18. A computer program product for managing a call having associated data representing call transport information, comprising a computer usable medium having machine readable code embodied therein for:

triggering a first policy based on the data;

selecting, based on the first policy, at least a first lexicon comprising a plurality of keywords;

comparing at least a first portion of the call to the first lexicon to identify keywords matched by the first portion of the call;

invoking a second policy based on the matched keywords; and taking an action specified by the second policy.

19. The computer program product as recited in claim 18, wherein the match is positive or negative.

* * * * *